(12) United States Patent
Adams et al.

(10) Patent No.: US 8,593,890 B2
(45) Date of Patent: Nov. 26, 2013

(54) IMPLEMENTING SUPPLY AND SOURCE WRITE ASSIST FOR SRAM ARRAYS

(75) Inventors: Chad A. Adams, Byron, MN (US);
Sharon H. Cesky, Rochester, MN (US);
Elizabeth L. Gerhard, Rochester, MN (US); Jeffrey M. Scherer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/455,394

(22) Filed: Apr. 25, 2012

(65) Prior Publication Data

US 2013/0286717 A1 Oct. 31, 2013

(51) Int. Cl.
*G11C 7/22* (2006.01)
*G11C 5/14* (2006.01)
*G11C 7/00* (2006.01)
*G11C 11/00* (2006.01)

(52) U.S. Cl.
USPC . 365/189.16; 365/154; 365/156; 365/189.09; 365/189.11

(58) Field of Classification Search
USPC .................................................... 365/189.16
See application file for complete search history.

(56) References Cited

U.S. PATENT DOCUMENTS

| 8,363,453 | B2 * | 1/2013 | Arsovski et al. | 365/154 |
| 8,411,518 | B2 * | 4/2013 | Janardan et al. | 365/194 |
| 2006/0140000 | A1 | 6/2006 | Liao et al. | |
| 2007/0081379 | A1 * | 4/2007 | Clinton et al. | 365/149 |
| 2008/0055995 | A1 | 3/2008 | Ito | |
| 2009/0086528 | A1 | 4/2009 | Hanafi | |
| 2009/0180345 | A1 | 7/2009 | Ch'Ng et al. | |

(Continued)

FOREIGN PATENT DOCUMENTS

| JP | 200004860 | 2/2000 |
| JP | 2009277341 | 11/2009 |

OTHER PUBLICATIONS

Amrutur, Bharadwaj S., "Design and Analysis of Fast Low Power SRAMs", Dissertation Submitted to the Department of Electrical Engineering and the Committee on Graduate Studies of Stanford University in Partial Fulfillment of the Requirements for the Degree of Doctor of Philosophy, Aug. 1999.

(Continued)

*Primary Examiner* — Son Mai
(74) *Attorney, Agent, or Firm* — Joan Pennington

(57) ABSTRACT

A method and circuit for implementing write assist for Static Random Access Memory (SRAM) arrays, and a design structure on which the subject circuit resides are provided. The circuit includes a write driver including a common bit line supply node, and a common bit line source node. The circuit includes voltage boost circuitry that temporarily boosts the common bit line supply node above supply voltage and temporarily boosts the common bit line source node below source voltage through isolation devices for applying the boosted source and supply voltages to a selected SRAM cell during a write operation. Splitting the boost differential between the common bit lines decreases an overall device voltage differential for providing substantially enhanced reliability of the SRAM array.

20 Claims, 4 Drawing Sheets

(56) References Cited

U.S. PATENT DOCUMENTS

| | | |
|---|---|---|
| 2009/0235171 A1 | 9/2009 | Adams et al. |
| 2009/0273979 A1 | 11/2009 | Aritome |
| 2009/0285039 A1 | 11/2009 | Adams et al. |
| 2010/0188909 A1 | 7/2010 | Kenkare et al. |
| 2010/0232244 A1* | 9/2010 | Hirabayashi .................. 365/208 |
| 2010/0296354 A1 | 11/2010 | Kobayashi |
| 2011/0019495 A1 | 1/2011 | Scheuerlein et al. |
| 2012/0033517 A1 | 2/2012 | Cheng et al. |
| 2012/0287733 A1* | 11/2012 | van Winkelhoff et al. ........................ 365/189.16 |

OTHER PUBLICATIONS

Chen, Gregory K., Power Management and SRAM for Energy-Autonomous and Low-Power Systems, 2011.

Shin, Changhwan, "Advanced MOSFET Designs and Implications for SRAM Scaling", Spring 2011.

* cited by examiner

US 8,593,890 B2

IMPLEMENTING SUPPLY AND SOURCE WRITE ASSIST FOR SRAM ARRAYS

FIELD OF THE INVENTION

The present invention relates generally to the data processing field, and more particularly, relates to a method and circuit for implementing supply and source write assist for Static Random Access Memory (SRAM) arrays, and a design structure on which the subject circuit resides.

DESCRIPTION OF THE RELATED ART

As technology has scaled balance between Static Random Access Memories (SRAMs) cell stability and read and write performance has grown difficult to achieve. Often improvements in one of these important factors will adversely impact the others.

One method of achieving balance is write assist circuitry that temporarily boosts the voltage differential between the write data true and complement nodes during the write cycle of a cell. This increases the write-ability of the SRAM cell without impacting stability by temporarily increasing the relative strength of the SRAM pass gate devices during a write operation. The pass gate devices can thus be tuned for SRAM stability without adversely impacting write-ability and write performance.

For example, U.S. patent publication US 2009/0235171 A1 to Chad A. Adams et al., and assigned to the present assignee discloses apparatus for implementing a write assist for a memory array that includes a common discharge node configured to provide a discharge path for precharged write data lines and bit lines selected during a write operation of the memory array; negative boost circuitry configured to introduce a voltage lower than a nominal logic low supply voltage onto the common discharge node following the discharge of the common discharge node, write data lines and bit lines; and a clamping device coupled to the common discharge node, the clamping device configured to limit the magnitude of negative voltage applied to common discharge node by the negative boost circuitry so as to prevent activation of non-selected bit switches.

While the above identified U.S. patent publication provides improvements over prior art arrangements, a need exists for a circuit having an improved mechanism for implementing efficient and effective write assist for SRAM arrays. It is desirable to provide such a mechanism to enable the use of a small device dimension SRAM cell, saving static leakage power, increasing efficiency, and achieving SRAM cell stability, write-ability, and performance.

SUMMARY OF THE INVENTION

Principal aspects of the present invention are to provide a method and circuit for supply and source write assist for Static Random Access Memory (SRAM) arrays, and a design structure on which the subject circuit resides. Other important aspects of the present invention are to provide such method, circuit and design structure substantially without negative effects and that overcome many of the disadvantages of prior art arrangements.

In brief, a method and circuit for implementing write assist for Static Random Access Memory (SRAM) arrays, and a design structure on which the subject circuit resides are provided. The circuit includes a write driver including a common bit line supply node, and a common bit line source node. The circuit includes voltage boost circuitry that temporarily boosts the common bit line supply node above supply voltage and temporarily boosts the common bit line source node below source voltage through isolation devices for applying the boosted source and supply voltages to a selected SRAM cell during a write operation. Splitting the boost differential between the common bit lines decreases an overall device voltage differential for providing substantially enhanced reliability of the SRAM array.

In accordance with features of the invention, a first complementary pair of isolation devices is implemented with a respective P-channel field effect transistor (PFET) controlled by a respective complementary input data, DATAT and DATAC, ensuring that only one of the complementary write data line nodes WLT and WLC receive positive boost for write assist. A second complementary pair of isolation devices is implemented with a respective N-channel field effect transistor (NFET) controlled by the respective complementary input data, DATAT and DATAC, ensuring that only one of the complementary write data line nodes WLT and WLC receive negative boost for write assist.

In accordance with features of the invention, the voltage boost circuitry includes a respective delay stage inverter pair receiving a write select control signal and a respective boost capacitor respectively coupled between an output of the respective delay stage inverter pair and the common bit line supply node or the common bit line source node. The charging of the respective boost capacitors respectively temporarily boosts the common bit line supply node above supply voltage and temporarily boosts the common bit line source node below source voltage.

In accordance with features of the invention, the voltage boost circuitry includes a first clamping device to prevent the applied positive boost to the common bit line supply node from rising to a level at which unselected devices are activated or otherwise adversely affected and a second clamping device to prevent the applied negative voltage boost to the common bit line source node from activating or affecting unintended devices.

In accordance with features of the invention, the first clamping device is implemented in the form of a diode connected PFET and the second clamping device is implemented in the form of a diode connected NFET.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuit for implementing enhanced write assist for Static Random Access Memory (SRAM) arrays, and a design structure on which the subject circuit resides are provided. The circuit includes a write driver including a common bit line supply node, and a common bit line source node. The circuit includes voltage boost circuitry temporarily boosts the common bit line supply node above supply voltage and temporarily boosts the common bit line source node below source voltage through isolation devices applying the boosted source and supply voltages to a selected SRAM cell during a write operation. Splitting the boost differential between the common bit lines, the total voltage differential seen by any one device is decreased, providing substantially enhanced reliability of the SRAM array.

Figure 1:
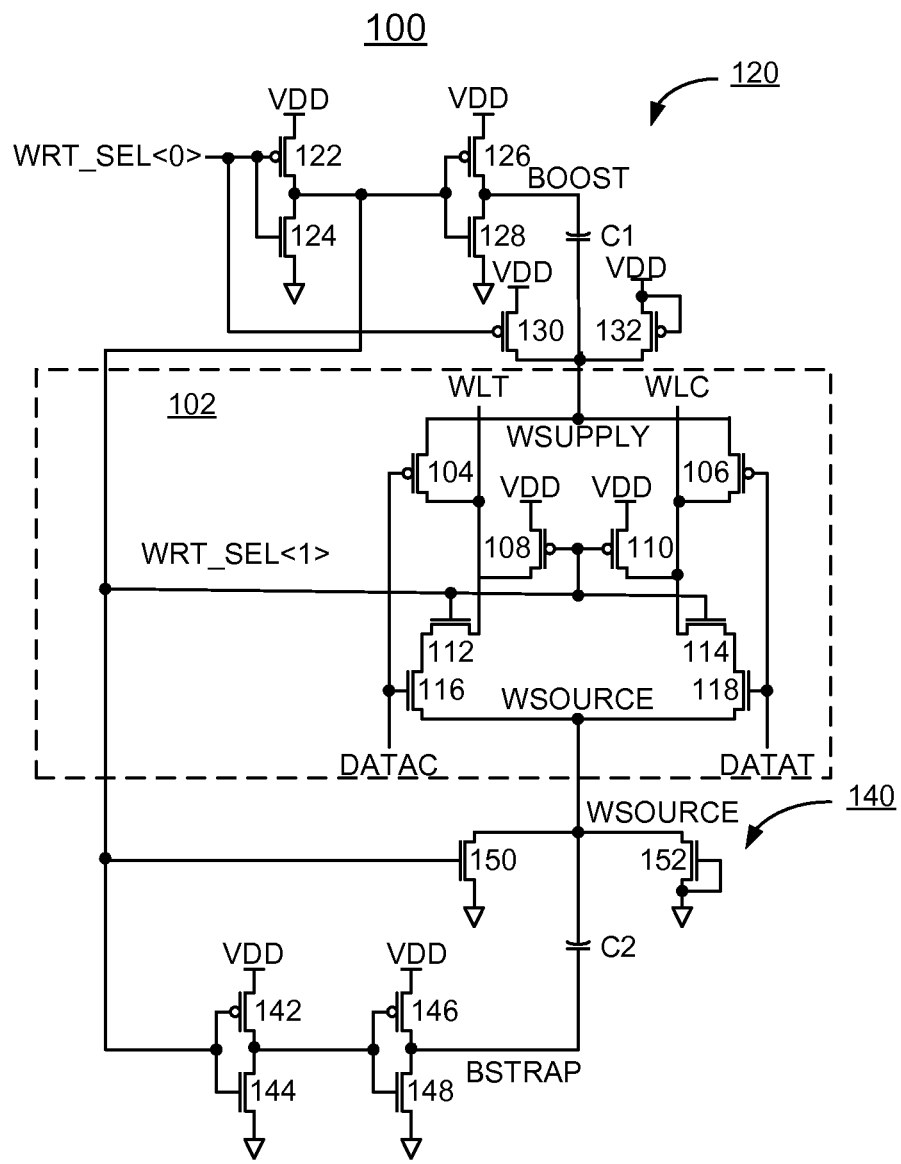
FIG. 1 schematically illustrates an example circuit for implementing enhanced write assist for Static Random Access Memory (SRAM) arrays in accordance with a preferred embodiment.

Having reference now to the drawings, in FIG. 1 schematically illustrates an example circuit for implementing enhanced write assist for Static Random Access Memory (SRAM) arrays generally designated by the reference character 100 in accordance with a preferred embodiment.

SRAM circuit 100 enables the use of a smaller device dimension SRAM cell saving static leakage power and increasing efficiency. Typically a larger SRAM cell is used to achieve SRAM cell stability, write-ability, and performance with larger devices necessary to achieve the pass gate current needed to flip the state of the SRAM cell during a write operation.

SRAM circuit 100 increases SRAM cell write-ability by temporarily boosting a common bit line supply node above supply voltage or logic high, and boosting a common bit line source node below source voltage or logic low, and through isolation devices applying these boosted source and supply voltages to the opposing pass gates of a selected SRAM cell during a write operation. SRAM circuit 100 boosts the opposite data line above the chip supply voltage during a write operation thereby effectively achieving a desired voltage boost in voltage differential. With some known SRAM write assist circuits, depending on the amount of the boost necessary to achieve desired performance and SRAM cell write-ability, end of life and device reliability concerns arise for the devices affected. By splitting the boost differential between the common bit lines with SRAM circuit 100, a total voltage differential seen by any one device is decreased, alleviating reliability and end of life concerns for the SRAM cells arrays.

In accordance with features of SRAM circuit 100 of the invention, advantages of negatively boosting a bitline while positively boosting its complement bitline are two-fold. First, the total differential (VDD+[Vboost]) across any one device is reduced therefore alleviating end of life (EOL) concerns. Second, where the voltage VCS is greater than the voltage VDD (VCS>VDD), a voltage differential (VCS−VDD) could exist between the logic 1 side of the cell and the bitline that is held at the voltage VDD causing the internal node of the written cell to drop by that voltage differential. Supplying a positive boost corrects or at least alleviates this and increases the write-ability of the cell especially in cases where the voltage differential VCS−VDD is large.

SRAM circuit 100 includes a write driver generally designated by the reference character 102 with no bit decode. SRAM write drive 102 is repeated based on bit decode to implement other bit decode options where WSUPPLY and WSOURCE can be shared on a per bit basis in accordance with a preferred embodiment.

SRAM write drive 102 includes a common bit line supply node labeled WSUPPLY, and a common bit line source node labeled WSOURCE. SRAM write drive 102 includes a plurality of P-channel field effect transistors (PFETs) 104, 106, 108, 110 and a plurality of N-channel field effect transistors (NFETs) 112, 114, 116, 118, as shown.

PFETs 104, 106 are isolation devices connected between the common bit line supply node WSUPPLY and the complementary write data line nodes WLT, WLC and receiving a respective input data DATAC and DATAT to ensure that only one of the complementary write data line nodes WLT and WLC receive positive boost for write assist. PFETs 108, 110 are precharge devices connected between a positive voltage supply rail VDD and a respective complementary write data line node WLT, WLC and receiving a control input of write select control signal WRT_SEL<1> for precharging the complementary write data line nodes WLT, WLC.

NFETs 116, 118 receiving a respective input data DATAC and DATAT are isolation devices respectively connected in series with NFETs 112, 114, which receive a control input of write select control signal WRT_SEL<1>. Series connected NFETs 116, 112 and series connected NFETs 118, 114 are respectively connected between the common bit line supply node WSOURCE and the complementary write data line nodes WLT, WLC to ensure that only one of the complementary nodes, WLT and WLC receive negative boost for write assist.

SRAM circuit 100 includes voltage boost circuitry generally designated by the reference character 120 that temporarily boosts the common bit line supply node above supply voltage through isolation devices applying the boosted supply voltage to a selected SRAM cell during a write operation. Voltage boost circuitry includes a boost capacitor C1 and a delay stage inverter pair defined by a first inverter PFET 122, and NFET 124, and a second inverter PFET 126, and NFET 128. The delay stage inverter pair receives a control input of write select control signal WRT_SEL<0> and provides an output at a node labeled BOOST. The boost capacitor C1 is coupled between the output of the delay stage inverter pair at node BOOST and the common bit line supply node WSUPPLY. The charging of the boost capacitor C1 temporarily boosts the common bit line supply node above the supply voltage during the write operation. Voltage boost circuitry includes a control PFET 130 receiving a control input of write select control signal WRT_SEL<0> and connected between the positive voltage supply rail VDD and the common bit line supply node VSUPPLY. Voltage boost circuitry includes a diode connected, clamping PFET 132 connected between the positive voltage supply rail VDD and the common bit line supply node VSUPPLY to prevent the applied positive boost from rising to a level at which unselected devices are activated or otherwise adversely affected.

SRAM circuit 100 includes voltage boost circuitry generally designated by the reference character 140 that temporarily boosts the common bit line source node below source voltage through isolation devices applying the boosted source and supply voltages to a selected SRAM cell below the source voltage during the write operation. Voltage boost circuitry includes a boost capacitor C2 and a delay stage inverter pair defined by a first inverter PFET 142, and NFET 144, and a second inverter PFET 146, and NFET 148. The delay stage inverter pair receives an input of the write select control signal WRT_SEL<1> and provides an output at a node labeled BSTRAP. The boost capacitor C2 is coupled between the output of the delay stage inverter pair at node BSTRAP and the common bit line supply node WSOURCE. The charging of the boost capacitor C2 temporarily boosts the common bit line source node below the supply voltage during the write operation. Voltage boost circuitry includes a control NFET 150 receiving a control input of write select control signal WRT_SEL<1> and connected between the common bit line source node VSOURCE and ground potential. Voltage boost circuitry includes a diode connected, clamping NFET 152 connected between the common bit line source node VSOURCE and ground potential to prevent the applied negative boost on the common bit line source node VSOURCE never increases beyond a device threshold voltage Vt. In this way the source terminals of unselected NFET bit switches are never biased to the extent that they could potentially become activated or otherwise adversely affected.

As shown, the complementary pair of the PFETs 104, 106 isolate a selected logical high write data line, respectively controlled by complementary input data, DATAC and DATAT, ensuring that only one of the complementary write data line nodes WLT and WLC receive positive boost for write assist. Likewise, NFETs 116, 118 respectively controlled by complementary input data, DATAC and DATAT ensure that only one of the complementary nodes, WLT and WLC receive negative boost for write assist.

Figure 2:
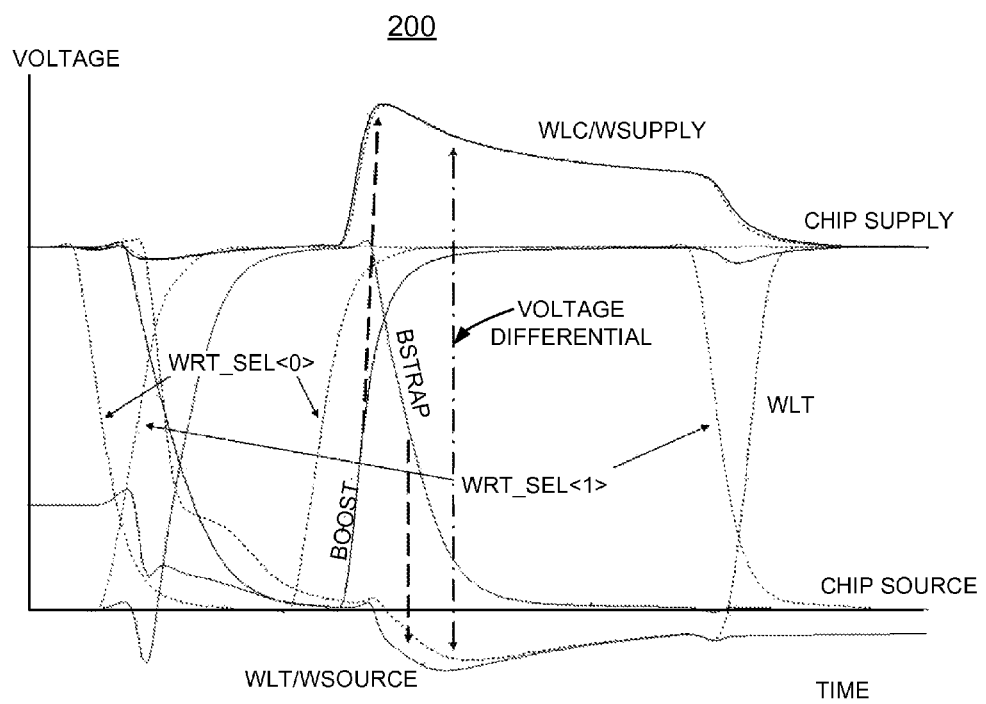
FIG. 2 are waveforms illustrating example operations of the circuit of FIG. 1 in accordance with a preferred embodiment.

Referring to FIG. 2, operation of SRAM circuit 100 may be understood as follows. SRAM write drive 102 input data DATAT and DATAC will be treated as static signals. If a logic 0 is to be written, DATAC, or the complement input data node, is held to logic high and DATAT, or the true input data node, is held to the inverse, logic low. In this case, NFET 118 is inactive and PFET 106 is active, and when the write operation occurs the node WLC is charged to logic high with some write assist voltage boost. Concurrently NFET 120 is active and PFET 104 is inactive, and the node WLT is discharged to logic low with some negative boost through NFETs 116, 118. The inverse is true for writing a logic 1.

If a logic 1 is to be written, DATAC, or the complement input data node, is held to logic low and DATAT, or the true input data node, is held to the inverse, logic high. In this case, NFET 118 is active and PFET 106 is inactive, and when the write operation occurs the node WLT is charged to logic high with some write assist voltage boost. Concurrently NFET 120 is inactive and PFET 104 is active, and the node WLC is discharged to logic low with some negative boost through PFETs 108, 110.

Referring now to FIG. 2, there are shown waveforms generally designated by the reference character 200 illustrating example operations of the circuit 100 in accordance with the invention.

At the outset of a WRITE operation WRT_SEL<1> is held to logic low NFETs 112, 114 are inactive, and precharge PFETs 108, 110 are active charging both WLC and WLT to logic high or the precharge state. WRT_SEL<0> is held to logic high and PFET 130 and NFET 130 are inactive. The output of the delay stage inverter pair of at node BOOST of voltage boost circuitry 120 is held to logic high through PFET 126 and fully charges capacitive device C1, causing WSUPPLY to resolve to logic high. The output of the delay stage inverter pair of voltage boost circuitry 140 at node BSTRAP, or the negative boost node, is held to logic low through NFET 146, and the capacitive device C2 is fully discharged and WSOURCE resolves to logic low.

The write assist for the WRITE operation is enabled when WRT_SEL<0> transitions to logic low and WRT_SEL<1> concurrently transitions to logic high. Precharge PFETs 108, 110 turn off and, depending on the data input, either WLT or WLC begins to discharge to logic low. FIG. 2 illustrates a logic 0 being written to the SRAM cell, thus WLT begins to discharge to logic low. WRT_SEL<0> activates PFET 130 and holds WSUPPLY to logic high even as BOOST discharges to logic low through the delay stage output inverter NFET 128. Through the first inverter of the delay stage inverter pair defined by PFET 122 and NFET 124, NFET 150 is activated holding node WSOURCE to logic low, and node BSTRAP is charged to logic high through PFET 146.

After a short delay, WRT_SEL<0> transitions to logic high and PFET 130 is deactivated leaving WSUPPLY floating at logic high. Also, NFET 150 is deactivated leaving WSOURCE floating at or near logic low. A positive coupling write assist boost is then, after 1 device delay, applied to the common bit line supply node WSUPPLY through capacitive device C1 as BOOST is charged from logic low to logic high through PFET 126. A negative coupling write assist boost is applied to the common bit line source node WSOURCE through capacitive device C2 as BSTRAP is discharged from logic high to logic low through NFET 148.

The positive write assist boost at the common bit line supply node WSUPPLY is passed through PFET 104 or PFET 106 to WLT or WLC and is applied to the pass gate transistor of the targeted SRAM cell (not shown). Clamping PFET 132, shown in the form of a diode connected PFET, ensures that the positive boost voltage on WSUPPLY never increases beyond a device Vt. In this way the source terminals of unselected PFET bit switches are never biased to the extent that they could potentially become active.

The negative write assist boost at the common bit line source node WSOURCE is passed through NFET 116 or NFET 118 to WLT or WLC is applied to the other pass gate of the targeted SRAM cell. Clamping NFET 152, shown in the form of a diode connected NFET ensures that the negative boost voltage on WSOURCE never increases beyond a device Vt. In this way the source terminals of unselected NFET bit switches are never biased to the extent that they could potentially become active.

As indicated in FIG. 2 at the arrow label VOLTAGE DIFFERENTIAL, a selected SRAM cell (not shown) sees an effective voltage differential across the pass gates of the SRAM device of the standard difference in source and supply and the total absolute value of the positive and negative boosts. As shown in FIG. 2, as BOOST rises, a positive coupling boost is seen on WSUPPLY and WLC and as BSTRAP falls a negative coupling boost is seen on WSOURCE and WLT indicated at respective lines WLC/WSUPPLY and WLT/WSOURCE. As illustrated in FIG. 2, the voltage differential at the targeted SRAM cell can be computed as the voltage difference between WLT and WLC and can be seen to be a significant delta above what is possible with the standard chip source and supply indicated at respective lines CHIP SUPPLY and CHIP SOURCE.

Figure 3:
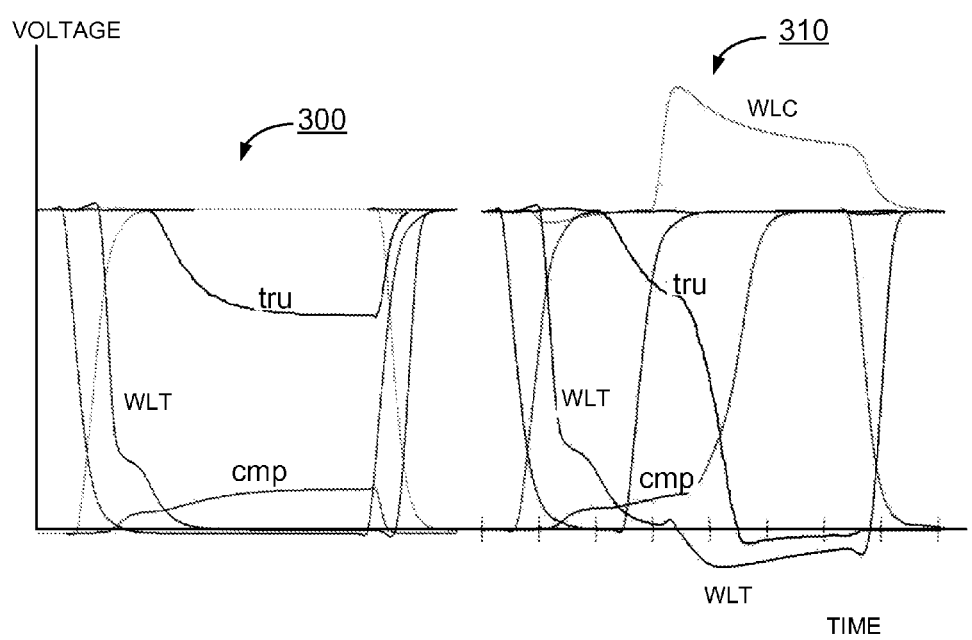
FIG. 3 are respective waveforms illustrating example operations including a failed attempt to write a logic 0 to a skewed SRAM and a successful write of a logic 0 to the same skewed SRAM cell with write assist enabled of the circuit of FIG. 1 in accordance with a preferred embodiment.

FIG. 3 are respective waveforms illustrating example operations including a failed attempt to write a logic 0 to a skewed SRAM generally designated by the reference character 300 and a successful write of a logic 0 to the same skewed SRAM cell with write assist enabled of the circuit of FIG. 1 in accordance with a preferred embodiment. In the illustrated operations 300 without write assist enabled, a failed attempt to write a logic 0 to a skewed SRAM results. In the illustrated operations 310 with write assist enabled, a successful write of a logic 0 results with a positive coupling boost is seen on WLC and a negative coupling boost is seen on WLT.

Figure 4:
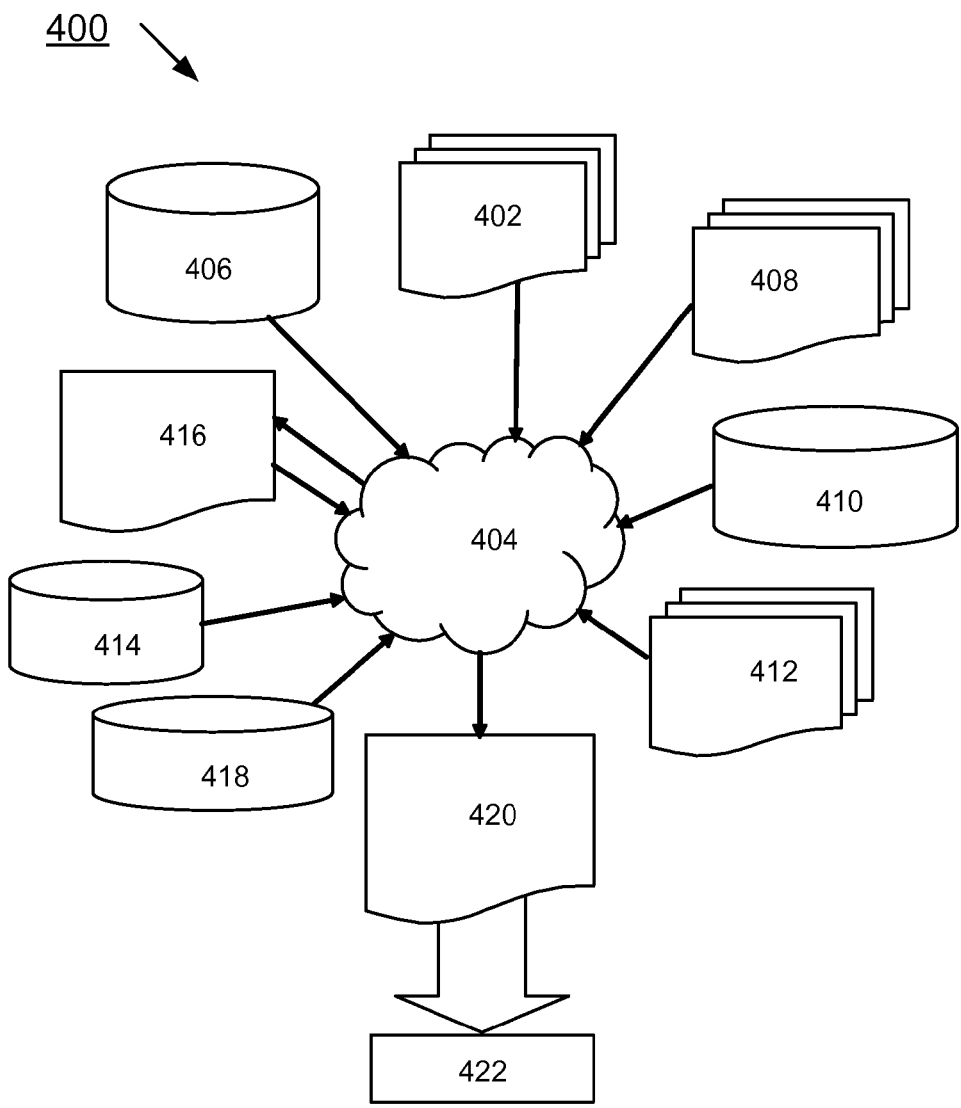
FIG. 4 is a flow diagram of a design process used in semiconductor design, manufacturing, and/or test.

FIG. 4 is a flow diagram of a design process used in semiconductor design, manufacturing, and/or test. FIG. 4 shows a block diagram of an example design flow 400. Design flow 400 may vary depending on the type of IC being designed. For example, a design flow 400 for building an application specific IC (ASIC) may differ from a design flow 400 for designing a standard component. Design structure 402 is preferably an input to a design process 404 and may come from an IP provider, a core developer, or other design company or may be generated by the operator of the design flow, or from other sources. Design structure 402 comprises circuit 100 in the form of schematics or HDL, a hardware-description language, for example, Verilog, VHDL, C, and the like. Design structure 402 may be tangibly contained on one or more machine readable medium. For example, design structure 402 may be a text file or a graphical representation circuit 100. Design process 404 preferably synthesizes, or translates, circuit 100 into a netlist 406, where netlist 406 is, for example, a list of wires, transistors, logic gates, control circuits, I/O, models, etc. that describes the connections to other elements and circuits in an integrated circuit design and recorded on at least one of machine readable medium. This may be an iterative process in which netlist 406 is resynthesized one or more times depending on design specifications and parameters for the circuit.

Design process 404 may include using a variety of inputs; for example, inputs from library elements 404 which may house a set of commonly used elements, circuits, and devices, including models, layouts, and symbolic representations, for a given manufacturing technology, such as different technology nodes, 42 nm, 45 nm, 90 nm, and the like, design specifications 410, characterization data 412, verification data 414, design rules 416, and test data files 418, which may include test patterns and other testing information. Design process 404 may further include, for example, standard circuit design processes such as timing analysis, verification, design rule checking, place and route operations, and the like. One of ordinary skill in the art of integrated circuit design can appreciate the extent of possible electronic design automation tools and applications used in design process 404 without deviating from the scope and spirit of the invention. The design structure of the invention is not limited to any specific design flow.

Design process 404 preferably translates embodiments of the invention as shown in FIG. 1, along with any additional integrated circuit design or data (if applicable), into a second design structure 420. Design structure 420 resides on a storage medium in a data format used for the exchange of layout data of integrated circuits, for example, information stored in a GDSII (GDS2), GL1, OASIS, or any other suitable format for storing such design structures. Design structure 420 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1. Design structure 420 may then proceed to a stage 422 where, for example, design structure 420 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A circuit for implementing write assist for Static Random Access Memory (SRAM) arrays comprising:
   a write driver including a common bit line supply node, and a common bit line source node;
   voltage boost circuitry temporarily boosting the common bit line supply node above supply voltage and temporarily boosting the common bit line source node below source voltage during a write operation, and splitting a boost differential between common bit lines and decreasing an overall device voltage differential for providing substantially enhanced reliability for the SRAM arrays.

2. The circuit as recited in claim 1 wherein said write driver includes isolation devices for applying a positive boosted voltage of the common bit line supply node to a selected one of complementary write data line nodes and isolation devices for applying a negative boosted voltage of the common bit line source node to a selected one of the complementary write data line nodes during a write operation.

3. The circuit as recited in claim 2 wherein said isolation devices for applying the negative boosted voltage include a complementary pair of N-channel field effect transistors (NFETs) controlled by a complementary input data.

4. The circuit as recited in claim 2 wherein said isolation devices for applying the positive boosted voltage include a complementary pair of P-channel field effect transistors (PFETs) controlled by a complementary input data.

5. The circuit as recited in claim 1 wherein said voltage boost circuitry includes a first boost capacitor and a first delay stage inverter pair for boosting the common bit line supply node above supply voltage during the write operation.

6. The circuit as recited in claim 5 includes a second boost capacitor and a second delay stage inverter pair for boosting the common bit line source node below source voltage during the write operation.

7. The circuit as recited in claim 1 wherein said voltage boost circuitry includes a first clamping device for clamping an applied positive boost voltage to the common bit line supply node.

8. The circuit as recited in claim 7 includes a second clamping device for clamping an applied negative boost voltage to the common bit line source node.

9. A design structure embodied in a machine readable medium used in a design process, the design structure comprising:
   a circuit tangibly embodied in the machine readable medium used in the design process, said circuit for implementing write assist for Static Random Access Memory (SRAM) arrays, said circuit comprising:
   a write driver including a common bit line supply node, and a common bit line source node;
   voltage boost circuitry temporarily boosting the common bit line supply node above supply voltage and temporarily boosting the common bit line source node below source voltage during a write operation, and splitting a boost differential between common bit lines and decreasing an overall device voltage differential for providing substantially enhanced reliability for the SRAM arrays, wherein the design structure, when read and used in manufacture of a semiconductor chip produces a chip comprising said circuit.

10. The design structure of claim 9, wherein the design structure comprises a netlist, which describes said circuit.

11. The design structure of claim 9, wherein the design structure resides on storage medium as a data format used for exchange of layout data of integrated circuits.

12. The design structure of claim 9, wherein the design structure includes at least one of test data files, characterization data, verification data, or design specifications.

13. The design structure of claim 9, wherein said write driver includes isolation devices for applying a negative boosted voltage of the common bit line source node to a selected high write data line and a positive boosted voltage of the common bit line supply node to a selected logical low write data line during a write operation.

14. The design structure of claim 9, wherein said voltage boost circuitry includes a first clamping device for clamping an applied positive boost voltage to the common bit line supply node, and a second clamping device for clamping an applied negative boost voltage to the common bit line source node.

15. A method for implementing write assist for Static Random Access Memory (SRAM) arrays comprising:
providing a write driver including a common bit line supply node, and a common bit line source node;
providing voltage boost circuitry temporarily boosting the common bit line supply node above supply voltage and temporarily boosting the common bit line source node below source voltage during a write operation, and splitting a boost differential between common bit lines and decreasing an overall device voltage differential for providing substantially enhanced reliability for the SRAM arrays.

16. The method as recited in claim 15 wherein providing said write driver includes providing isolation devices for applying a positive boosted voltage of the common bit line supply node to a selected one of complementary write data line nodes and isolation devices for applying a negative boosted voltage of the common bit line source node to a selected one of the complementary write data line nodes during a write operation.

17. The method as recited in claim 16 includes providing isolation devices implemented by a complementary pair of P-channel field effect transistors (PFETs) controlled by a complementary input data for applying the positive boosted voltage of the common bit line supply node to the selected one of the complementary write data line nodes during a write operation.

18. The method as recited in claim 17 includes providing isolation devices implemented by a complementary pair of N-channel field effect transistors (NFETs) controlled by a complementary input data for applying the negative boosted voltage of the common bit line source node to the selected one of the complementary write data line nodes during a write operation.

19. The method as recited in claim 15 wherein providing said voltage boost circuitry includes providing a first boost capacitor and a first delay stage inverter pair for boosting the common bit line supply node above supply voltage during the write operation, and providing a second boost capacitor and a second delay stage inverter pair for boosting the common bit line source node below source voltage during the write operation.

20. The method as recited in claim 15 wherein providing said voltage boost circuitry includes providing a first clamping device for clamping an applied positive boost voltage to the common bit line supply node, and providing a second clamping device for clamping an applied negative boost voltage to the common bit line source node.

* * * * *